US012700736B2

(12) United States Patent
Javadekar et al.

(10) Patent No.: US 12,700,736 B2
(45) Date of Patent: Aug. 4, 2026

(54) SYSTEM AND METHOD FOR CONSERVING ENERGY RESOURCES IN A POWER-DISTRIBUTION NETWORK

(71) Applicant: SCHNEIDER ELECTRIC USA, INC., Boston, MA (US)

(72) Inventors: Virendra Shantaram Javadekar, Portland, OR (US); Matthew David Beasley, Dallas, TX (US)

(73) Assignee: SCHNEIDER ELECTRIC USA, INC., Boston, MA (US)

( * ) Notice: Subject to any disclaimer, the term of this patent is extended or adjusted under 35 U.S.C. 154(b) by 290 days.

(21) Appl. No.: 18/407,900

(22) Filed: Jan. 9, 2024

(65) Prior Publication Data

US 2025/0226658 A1 Jul. 10, 2025

(51) Int. Cl.
| | |
|---|---|
| *H02J 3/18* | (2026.01) |
| *H02J 3/01* | (2006.01) |
| *H02J 3/1807* | (2026.01) |
| *H02J 3/28* | (2006.01) |

(52) U.S. Cl.
CPC .............. *H02J 3/1807* (2013.01); *H02J 3/01* (2013.01); *H02J 3/28* (2013.01); *H02J 2203/10* (2020.01)

(58) Field of Classification Search
CPC .......... H02J 3/1807; H02J 3/18; H02J 3/1814; H02J 3/1821; H02J 3/0102; H02J 3/04; H02J 3/28; H02J 3/365; H02J 2203/10
See application file for complete search history.

(56) References Cited

U.S. PATENT DOCUMENTS

| | | | |
|---|---|---|---|
| 10,951,032 B2 | 3/2021 | Mondal | |
| 11,552,474 B2 | 1/2023 | Mondal | |
| 2012/0155126 A1* | 6/2012 | Yoneda | H02M 1/14 |
| | | | 363/40 |
| 2017/0110987 A1* | 4/2017 | Ghosh | H02M 1/12 |
| 2018/0183319 A1* | 6/2018 | Akita | H02J 7/0068 |

FOREIGN PATENT DOCUMENTS

| | | |
|---|---|---|
| CN | 105552927 A | 5/2016 |
| KR | 100768391 B1 | 10/2007 |

* cited by examiner

*Primary Examiner* — Nguyen Tran
(74) *Attorney, Agent, or Firm* — FIG. 1 Patents

(57) ABSTRACT

Examples of the disclosure include a power compensator comprising a power interface configured to be coupled to a power-distribution network, an inverter coupled to the power interface, a ripple filter coupled to the inverter, a compensation capacitor coupled to the power interface, and at least one controller configured to determine a target output current for the power compensator to provide to the power-distribution network via the power interface, determine a capacitor compensation current provided by the compensation capacitor, and control the inverter to provide an inverter current to the power interface, the inverter current being a difference between the target output current and the capacitor compensation current.

20 Claims, 4 Drawing Sheets

300

302 — Receive Sensor Information

304 — Determine Target Output Current

306 — Determine Capacitor Current

308 — Calculate Target Inverter Current

310 — Control Inverter to Provide Target Inverter Current

SYSTEM AND METHOD FOR CONSERVING ENERGY RESOURCES IN A POWER-DISTRIBUTION NETWORK

BACKGROUND

1. Field of the Disclosure

At least one example in accordance with the present disclosure relates generally to providing power compensation to conserve energy resources provided to industrial equipment, household appliances, and other loads that consume electrical power.

2. Discussion of Related Art

Power sources, such as utility grids, may distribute power to various loads via a distribution network. Power quality on the distribution network may vary depending on variations in the power source and/or loads. Degraded power quality may adversely affect the efficiency of power distribution, which may lead to a waste of energy resources on a utility grid.

SUMMARY

Examples of the methods and systems discussed herein are not limited in application to the details of construction and the arrangement of components set forth in the following description or illustrated in the accompanying drawings. The methods and systems may be capable of implementation in other embodiments and of being practiced or of being carried out in various ways. Examples of specific implementations are provided herein for illustrative purposes and are not intended to be limiting. Acts, components, elements, and features discussed in connection with any one or more examples may be configured to operate and/or be implemented in a similar role in any other examples.

The phraseology and terminology used herein is for the purpose of description. References to examples, embodiments, components, elements, or acts of the systems and methods herein referred to in the singular may also embrace embodiments including a plurality. Similarly, references in plural to embodiments, components, elements, or acts may be implemented as a singularity. References in the singular or plural form may therefore not be intended to limit the presently disclosed systems or methods, their components, acts, or elements. The use herein of "including," "comprising," "having," "containing," "involving," and variations so forth, may encompass the items listed thereafter and equivalents thereof as well as additional items.

References to "or" may be construed as inclusive so that any terms described using "or" may indicate any of a single, more than one, and all of the described terms. For example, the phrase "at least one of A or B" may refer A and/or B—that is, A only, B only, or A and B together. In addition, in the event of inconsistent usages of terms between this document and documents incorporated herein by reference, the term usage in the incorporated documents is supplementary to this document. For irreconcilable differences, the term usage in this document controls.

According to at least one aspect of the present disclosure, a power compensator is provided comprising a power interface configured to be coupled to a power-distribution network, an inverter coupled to the power interface, a ripple filter coupled to the inverter, a compensation capacitor coupled to the power interface, and at least one controller configured to determine a target output current for the power compensator to provide to the power-distribution network via the power interface, determine a capacitor compensation current provided by the compensation capacitor, and control the inverter to provide an inverter current to the power interface, the inverter current being a difference between the target output current and the capacitor compensation current.

In at least one example, the compensation capacitor is coupled in parallel with the inverter. In at least one example, the ripple filter includes at least one filter capacitor. In at least one example, a capacitance of the compensation capacitor is between 200 mF and 300 mF, and a capacitance of the at least one filter capacitor is between 20 mF and 40 mF. In at least one example, the power compensator includes at least one bank capacitor coupled to the inverter. In at least one example, the at least one controller is further configured to receive, from one or more sensors coupled to the power-distribution network, power information indicative of a reactive current on the power-distribution network.

In at least one example, the target output current is equal and opposite to the reactive current. In at least one example, the target output current is a leading reactive current and the reactive current on the power-distribution network is a lagging reactive current. In at least one example, the at least one controller is configured to determine the compensation capacitor current based on a capacitance of the compensation capacitor and based on the power information.

At least one example of the disclosure includes a method for controlling a power compensator including a compensation capacitor and an inverter, the method comprising determining a target output current for the power compensator to provide from the power compensator to a power-distribution network, determining a capacitor compensation current provided by the compensation capacitor, determining a difference between the target output current and the capacitor compensation current, and controlling the inverter to provide an inverter current to the power-distribution network, the inverter current being a difference between the target output current and the capacitor compensation current.

In at least one example, controlling the inverter to provide the inverter current includes controlling the inverter to draw power from at least one bank capacitor. In at least one example, the method includes receiving, from one or more sensors coupled to the power-distribution network, power information indicative of a reactive current on the power-distribution network. In at least one example, the target output current is equal and opposite to the reactive current. In at least one example, the target output current is a leading reactive current and the reactive current on the power-distribution network is a lagging reactive current. In at least one example, determining the compensation capacitor current is based on a capacitance of the compensation capacitor and based on the power information.

At least one example of the disclosure includes at least one non-transitory computer-readable medium storing thereon sequences of computer-executable instructions for controlling a power compensator including a compensation capacitor and an inverter, the sequences of computer-executable instructions including instructions that instruct at least one processor to determine a target output current for the power compensator to provide from the power compensator to a power-distribution network, determine a capacitor compensation current provided by the compensation capacitor, determine a difference between the target output current and the capacitor compensation current, and control the inverter to provide an inverter current to the power-distribution network, the inverter current being a difference between the target output current and the capacitor compensation current.

In at least one example, the instructions further instruct the at least one processor to receive, from one or more sensors coupled to the power-distribution network, power information indicative of a reactive current on the power-distribution network. In at least one example, the target output current is equal and opposite to the reactive current. In at least one example, the target output current is a leading reactive current and the reactive current on the power-distribution network is a lagging reactive current.

Examples of the disclosure include a power compensator comprising a power interface configured to be coupled to a power-distribution network, an inverter coupled to the power interface, a ripple filter coupled to the inverter, a compensation inductor coupled to the power interface, and at least one controller configured to determine a target output current for the power compensator to provide to the power-distribution network via the power interface, determine an inductor compensation current provided by the compensation inductor, and control the inverter to provide an inverter current to the power interface, the inverter current being a difference between the target output current and the inductor compensation current.

BRIEF DESCRIPTION OF THE DRAWINGS

Various aspects of at least one embodiment are discussed below with reference to the accompanying figures, which may not be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or substantially similar component that is illustrated in various figures may be represented by a like numeral. For purposes of clarity, not every component may be labeled in every figure. In the figures:

DETAILED DESCRIPTION

Utility grids distribute power to loads such as household appliances, industrial equipment, and any other loads connected to a power-distribution network. The quality of the power distributed to the loads may vary over time. In some examples, power quality may be considered ideal when all of the power is active power and none of the power is reactive power. Active power is used by the loads to perform work. Reactive power may not be used to perform the loads' desired functions, and may simply be wasted as heat. Moreover, reactive power may reduce the capacity of the power-distribution network and thereby cause inefficient asset utilization.

To conserve energy resources and reduce energy consumption by loads such as industrial equipment, household appliances, and other loads connected to a power-distribution network, it may be advantageous to improve power quality on the power-distribution network. Because a higher proportion of high-quality power is active power, more power can be used to perform work and less power is wasted as heat. Thus, by improving power quality, loads draw less power and thereby conserve energy resources. Power quality can be improved by implementing devices that provide power compensation, also referred to as power compensators. Power compensators may therefore reduce energy losses in power-distribution networks, which may service loads such as household appliances and industrial equipment, and thereby conserve energy resources.

Examples of the disclosure include systems and methods for providing power compensation. In one example, a power compensator is coupled to a power-distribution network, such as a utility grid. The power compensator may be a static VAR generator, an electronic VAR compensator, a STAT-COM compensator, or other power compensator. The power compensator provides power compensation by injecting or drawing leading or lagging current to or from the power-distribution network.

In examples discussed below, the power compensator includes an inverter configured to generate a desired current. Often, a desired current is a leading reactive current. Accordingly, in various examples discussed below, a capacitor is coupled to the inverter to provide a baseline leading reactive current. The inverter may provide the remainder of the leading reactive current over and beyond the baseline leading reactive current. Because the capacitor contributes the leading reactive current, a total output current from the inverter may be reduced. Reducing the load on the inverter improves the efficiency of the power compensator, which conserves energy resources consumed by the power compensator. Accordingly, examples provided herein enable more efficient power compensation to a power-distribution network.

Figure 1:
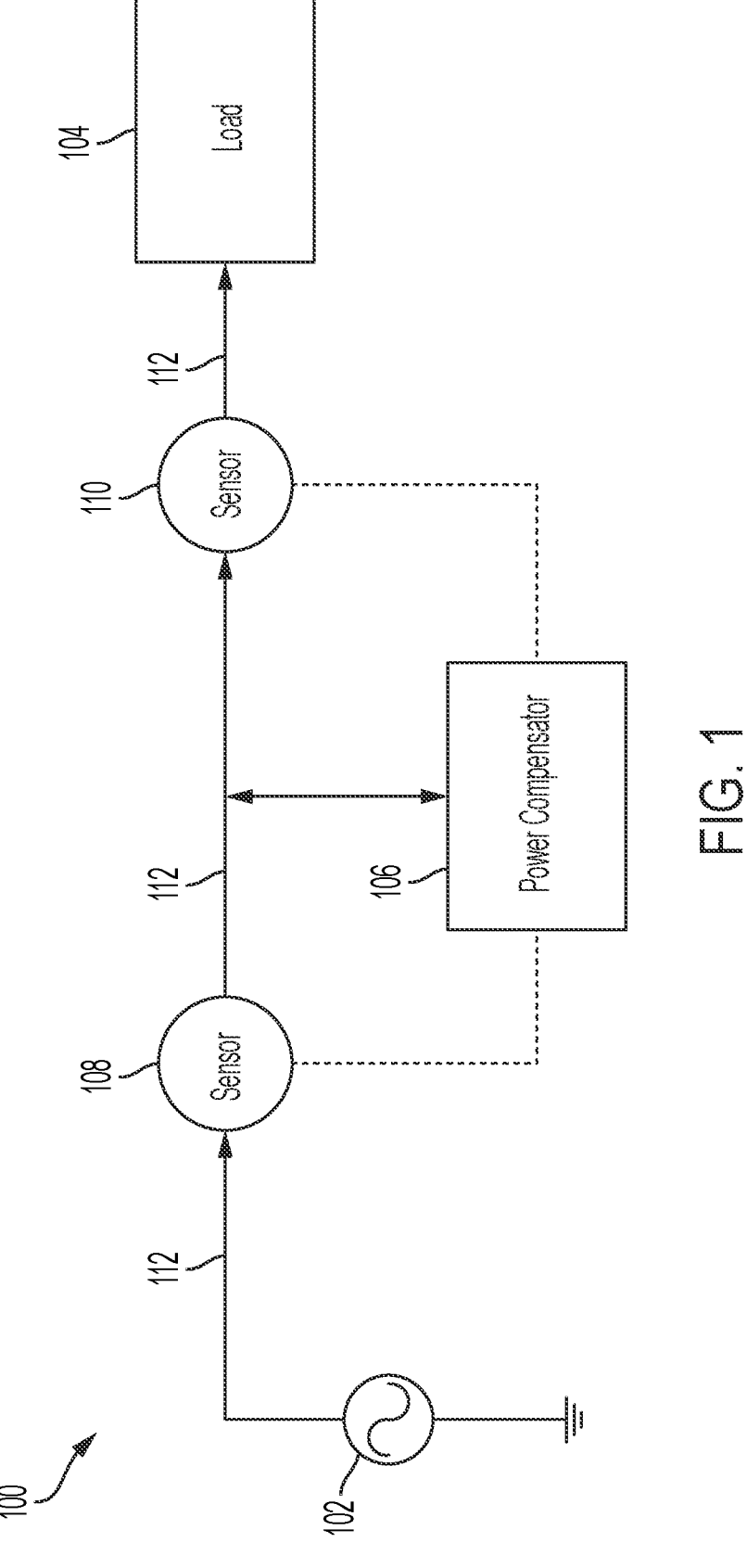
FIG. 1 illustrates a block diagram of a power system according to an example.

FIG. 1 illustrates a block diagram of a power system 100 according to an example. The power system 100 includes at least one power source 102 ("power source 102"), one or more loads 104 ("loads 104"), a power compensator 106 ("compensator 106"), and, optionally, at least one first optional sensor 108 ("first sensor 108") and at least one second optional sensor 110 ("second sensor 110"). In various examples, one or both of the optional sensors 108, 110 may be included. For example, the power system 100 may include the first sensor 108 but not the second sensor 110, or may include the second sensor 110 but not the first sensor 108, or may include both the first sensor 108 and the second sensor 110. In various examples, however, the power system 100 includes at least one of the sensors 108, 110. The power system 100 further includes a power-distribution line 112 ("line 112").

The power source 102 may include one or more power sources coupled to a utility grid, such as solar arrays, hydroelectric plants, nuclear-power plants, and so forth. The power source 102 is coupled to, and distributes power to, the loads 104 via the line 112. The power source 102 is coupled to the loads 104 via the first sensor 108 and the second sensor 110. A number and type of the power source 102 may vary over time, as may the power quality of power provided by the power source 102. Accordingly, a power quality of power provided to the line 112 may vary over time.

The loads 104 may include household appliances, industrial equipment, or any other loads that draw electrical power from the power source 102 via the line 112. The number, type, and power draw of loads 104 may change over time. For example, household appliances in the loads 104 may draw a substantial amount of power in the morning (for example, when most individuals are first waking up) and in the evening (for example, when most individuals are at home before going to sleep), but may not draw much power at other times (for example, in the middle of the night when most consumers are asleep). Power quality on the line 112 may fluctuate as the number, type, and power drawn of the loads 104 varies.

The compensator 106 is coupled to, and may provide power compensation to, the line 112. The compensator 106 may be coupled in parallel with the power source 102. For example, the compensator 106 may be coupled to the line 112 between the sensors 108, 110. The compensator 106 may be communicatively coupled to the sensors 108, 110. Examples of the compensator 106 are provided below with respect to FIG. 2.

As noted above, power quality on the line 112 may fluctuate with variations in the power provided by the power source 102 and/or the power drawn by the loads 104. The compensator 106 improves the power quality on the line 112 by compensating for these fluctuations. Compensation may include providing or drawing a leading or lagging reactive current to the line 112 to be provided to the load 104. For example, if the power on the line 112 includes a lagging current, the power compensator 106 may inject a leading current of equal magnitude.

The power provided to the loads 104 may be a combination of the power provided by the power source 102 and the power provided by the compensator 106. Thus, if the compensator 106 injects a leading reactive current equal in magnitude to a lagging reactive current already on the line 112 from the power source 102, the net reactive current seen by the loads 104 may be zero.

The first sensor 108 may include one or more voltage sensors and/or current sensors. The first sensor 108 may be coupled to the power source 102 upstream of the compensator 106. The first sensor 108 may sense power parameters such as current, voltage, and so forth, and provide power-parameter information to the compensator 106. In various examples, because the first sensor 108 is upstream of the compensator 106, the first sensor 108 may provide power-parameter information indicative of the power on the line 112 before any compensation is provided by the compensator 106. The compensator 106 may use the power-parameter information to determine how to interact with the line 112.

The second sensor 110 may include one or more voltage sensors and/or current sensors. The second sensor 110 may be coupled to the power source 102 downstream of the compensator 106. The second sensor 110 may sense power parameters such as current, voltage, and so forth, and provide power-parameter information to the compensator 106. In various examples, because the second sensor 110 is downstream of the compensator 106, the second sensor 110 may provide power-parameter information indicative of the power on the line 112 after any compensation is provided by the compensator 106. The compensator 106 may use the power-parameter information to determine how to interact with the line 112.

Figure 2:
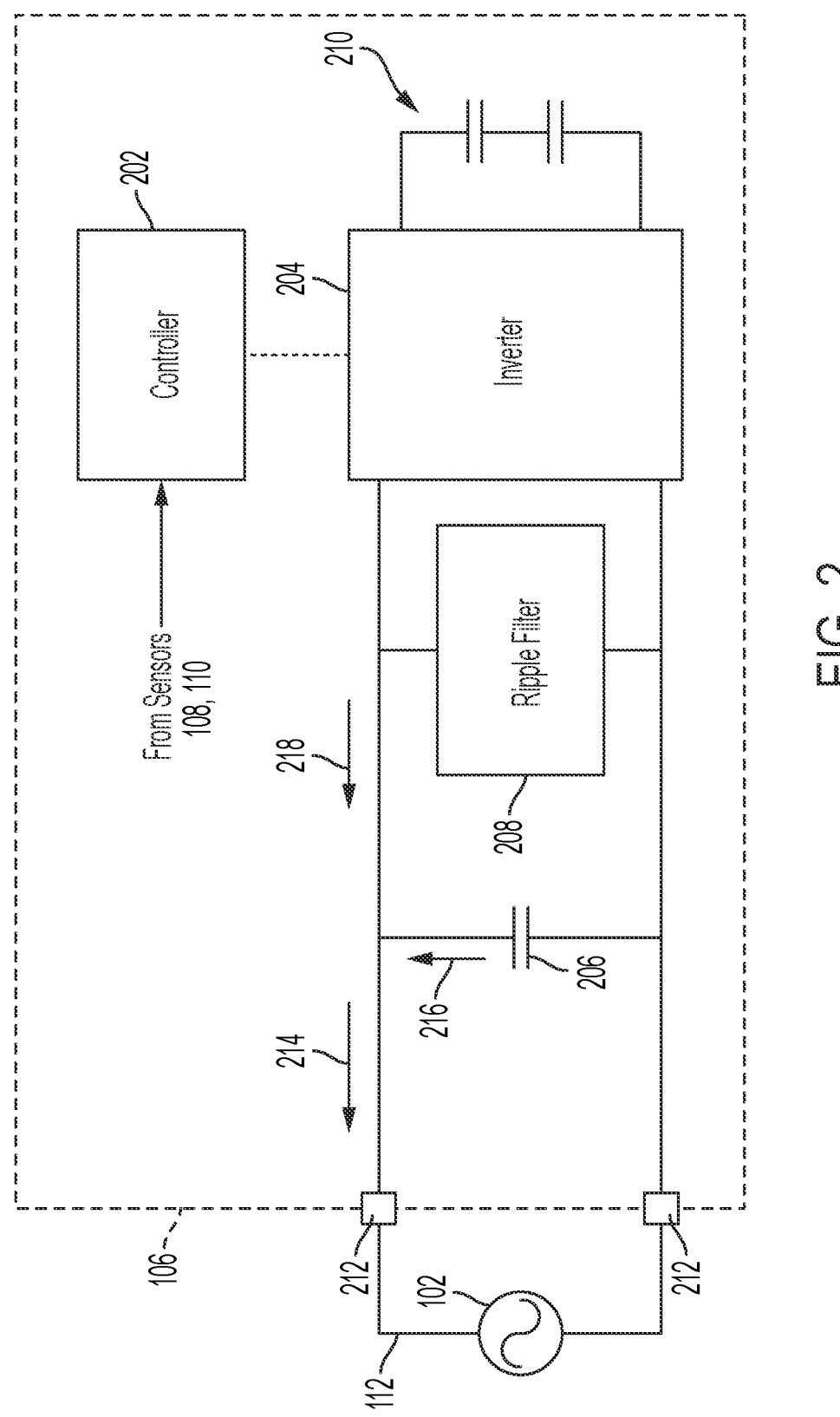
FIG. 2 illustrates a block diagram of a power compensator according to an example.

FIG. 2 illustrates a block diagram of the compensator 106 according to an example. Although FIG. 2 illustrates one example of the compensator 106, other implementations are within the scope of this disclosure, as discussed in greater detail below. The compensator 106 includes at least one controller 202 ("controller 202"), an inverter 204, a compensation capacitor 206, a ripple filter 208, one or more bank capacitors 210, and a power interface 212.

The controller 202 is communicatively coupled to, and is configured to control operations of, the inverter 204. The controller 202 is also communicatively coupled to, and is configured to receive power information (for example, current information, voltage information, and so forth) from, the sensors 108, 110. As discussed below, the controller 202 may control the inverter 204 by varying the respective switching states of one or more switching devices in the inverter 204.

The inverter 204 is coupled in parallel with the bank capacitors 210 at an input connection, and is coupled in parallel with the compensation capacitor 206, the ripple filter 208, and the power source 102 (via the power interface 212) at an output connection. The inverter 204 includes a plurality of switching devices configured to convert DC power (for example, from the bank capacitors 210) to AC power. For example, the inverter 204 may be implemented according to an H-bridge topology, or other known inverter topologies.

The compensation capacitor 206 and the ripple filter 208 are coupled in parallel with each other, and are further coupled in parallel with the power source 102 via the power interface 212 and with the inverter 204. The compensation capacitor 206 may include a capacitor with a relatively large capacitance (for example, on the order of 200 mF to 300 mF). The ripple filter 208 may include one or more capacitors, inductors, resistors, or combinations thereof, to reduce (for example, filter out) ripples in current provided by the inverter 204. Capacitors in the ripple filter 208 may, in some examples, be substantially smaller than the compensation capacitor 206. For example, the ripple filter 208 may include capacitors an order-of-magnitude smaller than the compensation capacitor 206 (for example, on the order of 20 mF to 40 mF).

As discussed below with respect to FIG. 3, the compensator 106 provides a total compensation current 214 to the power interface 212. The total compensation current 214 is provided to the loads 104 in combination with power from the power source 102 to compensate for lower-quality power from the power source 102. The total compensation current 214 is a combination of a capacitor compensation current 216 provided by the compensation capacitor 206, and an inverter current 218 provided by the inverter 204. The total compensation current 214, labeled $I_{214}$, may be expressed mathematically by Equation (1), $$I_{214} = I_{216} + I_{218}$$

where $I_{216}$ is the capacitor compensation current 216 and $I_{218}$ is the inverter current 218.

In various examples, power on the line 112 may in most cases be lagging. To compensate for this undesirable lagging, the total compensation current 214 may often be leading reactive current. As understood by those of ordinary skill in the art, capacitors such as the compensation capacitor 206 may provide a leading reactive current. Accordingly, for a given leading reactive current $I_{214}$ required by the line 112, a portion $I_{216}$ may be provided by the compensation capacitor 206. The remaining current $I_{218}$ provided by the inverter 204 may therefore be a small portion of the overall current $I_{214}$ required by the line 112. Without the compensation capacitor 206—and thus without the capacitor compensation current 216—the inverter current 218 would need to be substantially larger to meet the total compensation current 214.

Accordingly, by reducing an amount of the total compensation current 214 that is provided by the inverter 204, the efficiency of the inverter 204 may be improved. Energy resources may be conserved while simultaneously conserving energy resources on the line 112. The controller 202 may still operate the inverter 204 to provide leading reactive current to the line 112, but less than if the compensation capacitor 206 were omitted. In some examples, the inverter 204 may also be sized smaller because of the reduced load on the inverter 204.

In various examples, the controller 202 may operate the inverter 204 to provide fine-tuned control of the total compensation current 214. The capacitor compensation current 216 provides a baseline level of current, and the inverter current 218 provides any additional current required by the line 112. The capacitor compensation current 216 provided by the compensation capacitor 206 may be a sinusoidally varying leading reactive current. Accordingly, the controller 202 may control the inverter 204 such that the inverter current 218 accounts for (for example, varies in synchronization with) these sinusoidal variations.

Figure 3:
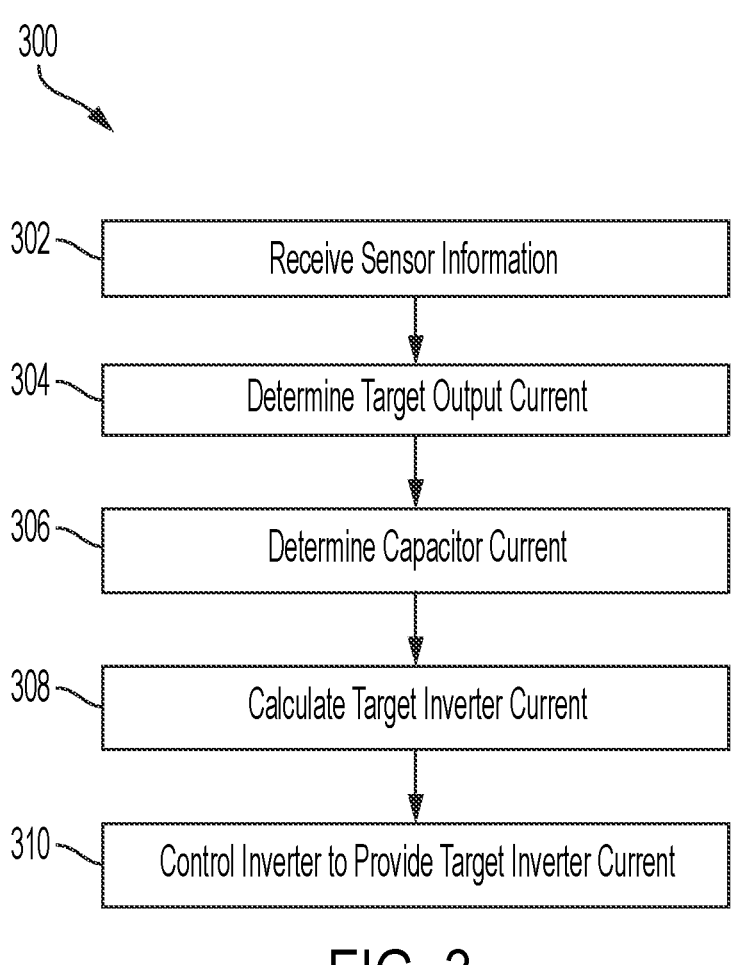
FIG. 3 illustrates a process of operating a power compensator according to an example.

FIG. 3 illustrates a process 300 of operating the compensator 106. The process 300 may be executed at least in part by the controller 202. For example, the process 300 may illustrate a method of the controller 202 controlling the compensator 106 to provide power compensation to the line 112.

At act 302, the controller 202 receives sensor information from one or both of the sensors 108, 110. The first sensor 108 may provide sensor information (for example, voltage and/or current information) indicative of power provided by the power source 102 to the loads 104 upstream of the compensator 106. The second sensor 108 may provide sensor information (for example, voltage and/or current information) indicative of power provided by the combination of both the power source 102 and the compensator 106 downstream of the compensator 106. That is, the first sensor 108 may provide power information indicative of uncompensated power directly from the power source 102, and the second sensor 110 may provide power information indicative of compensated power that has been compensated by the compensator 106.

At act 304, the controller 202 determines a target output current. A target output current is a target value for the total compensation current 214. The target output current is selected to compensate for lower-quality power on the line 112. For example, if the power provided by the power source 102 (for example, sensed by the first sensor 108) includes a 1 A lagging current, then the target output current may be a 1 A leading current. In various examples, therefore, the target output current is equal and opposite to any reactive current on the line 112.

Act 304 may include the controller 202 determining the reactive current provided by the power source 102 (for example, based on sensor information received at act 302) and determining the target output current as an equal and opposite of the target output current. If the sensor information includes the sensor information from the first sensor 108, the controller 202 may identify any leading or lagging reactive current in the uncompensated power and select the target current value based on the identified leading or lagging reactive current. If the sensor information includes the sensor information from the second sensor 110, the controller 202 may identify any remaining leading or lagging reactive current in the compensated power and update the target current value based on the remaining leading or lagging reactive current.

At act 306, the controller 202 determines the capacitor compensation current 216. As noted above, the capacitor compensation current 216 may be a leading reactive current provided by the compensation capacitor 206. In some examples, the controller 202 may calculate the capacitor compensation current 216. For example, the compensation capacitor 206 may have a known capacitance (for example, on the order of 200 mF to 300 mF), and a voltage across the compensation capacitor 206 may have a known value based on the sensor information received at act 302. The controller 202 may calculate the capacitor compensation current 216 based on the capacitance information and the voltage information. As noted above, the capacitor compensation current 216 may be a sinusoidally varying current.

At act 308, the controller 202 determines a target inverter current. The controller 202 may determine the target current $I_{218}$ based on Equation (1). To compute Equation (1), the controller 202 may use the target output current from act 304 as the total compensation current $I_{214}$ and may use the capacitor compensation current 216 from act 306 as the capacitor current $I_{216}$. Determining the target inverter current at act 308 may therefore include determining a difference between the target output current (for example, the total compensation current $I_{214}$) and the capacitor compensation current (for example, the capacitor current $I_{216}$). As noted above, because the capacitor current $I_{216}$ may be sinusoidally varying, the target inverter current $I_{218}$ may also be sinusoidally varying pursuant to Equation (1).

At act 310, the controller 202 controls the inverter 204 to provide the target inverter current $I_{218}$ determined at act 308. As noted above, the target inverter current $I_{218}$ determined at act 308 may be the difference between the target output current (for example, the total compensation current $I_{214}$) and the capacitor compensation current (for example, the capacitor current $I_{216}$). The inverter 204 may include one or more switching devices arranged in an inverter topology (for example, an H-bridge topology). The controller 202 provides control signals to each respective switching device to convert DC power drawn from the bank capacitors 210 into AC power. The AC power may be filtered by the ripple filter 208.

The controller 202 may repeatedly execute the process 300. As the power provided by the power source 102 varies, the controller 202 may vary the total compensation current 214 to compensate for variations in the power quality. For example, the controller 202 may detect changes in the power information received from the first sensor 108. In some examples, the controller 202 may also receive power information from the second sensor 110 to determine whether the compensated power has been appropriately conditioned. For example, if the controller 202 determines that undesirable reactive power is still present in the compensated power, the controller 202 may adjust the target inverter current $I_{218}$ at act 308 to adjust compensation of the power on the line 112.

As discussed above, the compensation capacitor 206 may be implemented where the total compensation current 214 is usually expected to be a leading reactive current. In alternative examples, such as where the total compensation current 214 is usually expected to be a lagging reactive current, the compensation capacitor 206 may be replaced with an inductor. Such a compensation inductor may have a substantially larger (for example, an order-of-magnitude larger) inductance than the inductance of the ripple filter 208.

Figure 4:
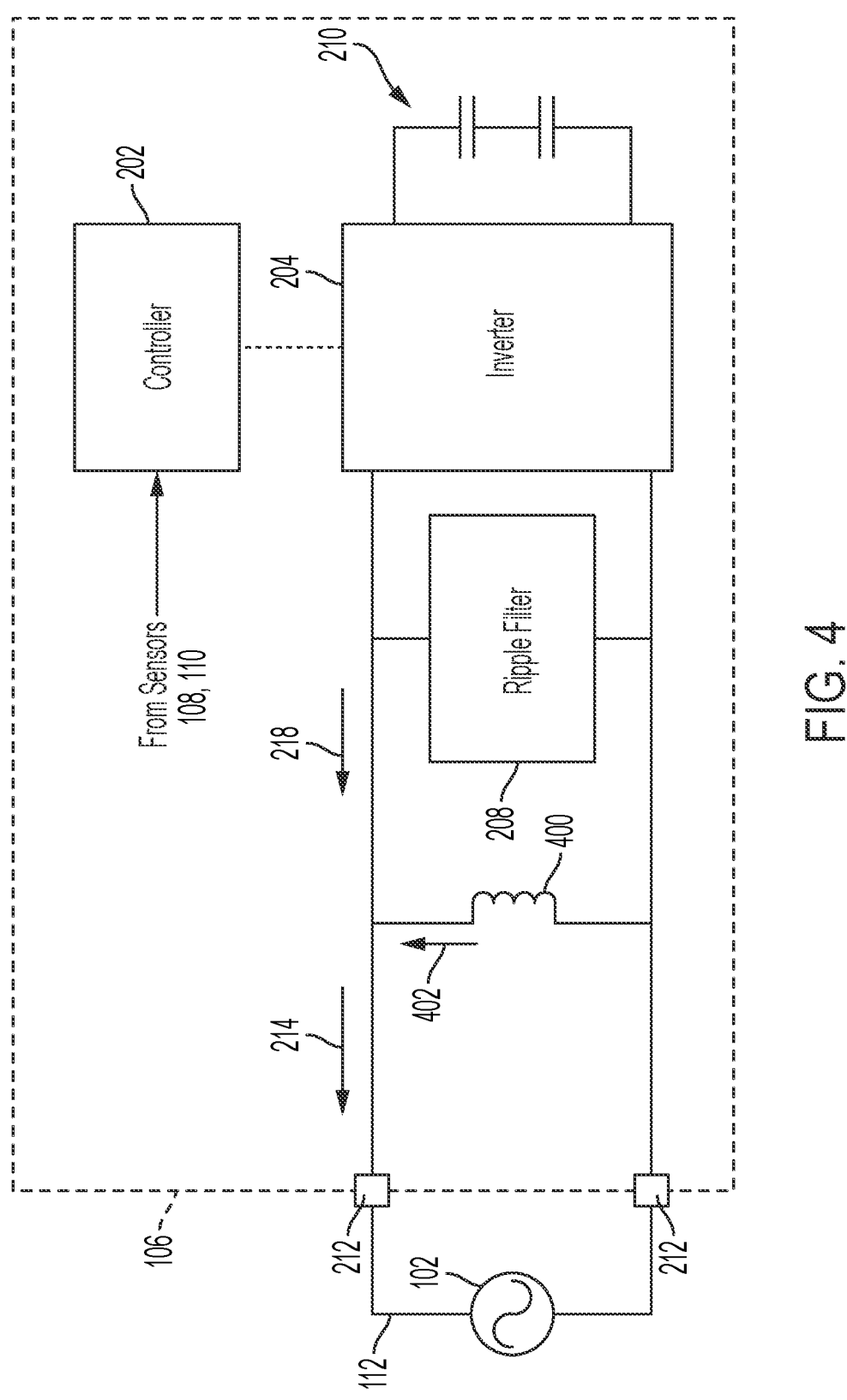
FIG. 4 illustrates a block diagram of a power compensator according to another example.

For example, FIG. 4 illustrates a block diagram of the power compensator 106 according to another example. The power compensator 106 of FIG. 4 is substantially similar to the power compensator 106 of FIG. 2, except that the compensator capacitor 206 is replaced by a compensation inductor 400. The compensation inductor 400 provides a compensation inductor current 402, and the total compensation current 214 is a sum of the compensation inductor current 402 and the inverter current 218. The controller 202 may execute the process 300 in a substantially similar manner, except that act 306 includes determining an inductor current (for example, the compensation inductor current 402) and acts 308 and 310 are based on this determined inductor current rather than the capacitor compensation current 216. Accordingly, act 306 may include determining an inductor compensation current, act 308 may include determining a target inverter current as a difference between a target output current and the inductor compensation current determined at act 306, and act 310 may include controlling the inverter 204 to provide this difference as an inverter current.

In some examples, the compensation capacitor 206 may be a single capacitor. In other examples, the compensation capacitor 206 may include a tunable capacitor and/or a network of series- and/or parallel-connected capacitors. In some examples, such a network may be switchable and controlled by the controller 202 such that the controller 202 can switch capacitors in and out, thereby varying the capacitance of the compensation capacitor 206. For example, if the compensator 106 needs to provide more leading reactive current, then the controller 202 may control the compensation capacitor 206 to increase in total capacitance.

Furthermore, in some examples, the compensation capacitor 206 may be coupled to, or replaced by, one or more compensation inductors. In this example, a compensation network including the compensation capacitor 206 and the compensation inductors may be switchably controlled by the controller 202. The controller 202 may switch inductors and/or capacitors in and out to control a total reactance of the compensation network. For example, if the compensator 106 needs to provide a leading reactive current, then the controller 202 may switch capacitors in and inductors out. If the compensator 106 needs to provide a lagging reactive current, then the controller 202 may switch inductors in and capacitors out. A network of capacitors and/or inductors, which may or may not be switchably couplable to the power interface 212, may be coupled across the power interface 212 in lieu of the compensation capacitor 206 and may be referred to as a "compensation circuit."

As discussed above, the compensation capacitor 206 may have a relatively large capacitance. In one example, the capacitance of the compensation capacitor 206 is approximately 240 mF, such as by being within 1 mF of 240 mF, or within 5 mF of 240 mF, or within 10 mF of 240 mF, or within 15 mF of 240 mF, or within 20 mF of 240 mF, or within 25 mF of 240 mF, or within 30 mF of 240 mF, or within 35 mF of 240 mF, or within 40 mF of 240 mF, or within some other range.

As discussed above, the capacitance of the ripple filter 208 may be relatively small. In one example, the capacitance of the ripple filter 208 is approximately 30 mF, such as by being within 1 mF of 30 mF, or within 5 mF of 30 mF, or within 10 mF of 30 mF, or within 15 mF of 30 mF, or within 20 mF of 30 mF, or within some other range.

Various controllers, such as the controller 202, may execute various operations discussed above. The controller 202 may also execute one or more instructions stored on one or more non-transitory computer-readable media, which the controller 202 may include and/or be coupled to, which may result in manipulated data. The non-transitory computer-readable media may include memory and/or storage. In some examples, the controller 202 may include one or more processors or other types of controllers. In one example, the controller 202 is or includes at least one processor. In another example, the controller 202 performs at least a portion of the operations discussed above using an application-specific integrated circuit tailored to perform particular operations in addition to, or in lieu of, a processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A power compensator comprising:
   a power interface configured to be coupled to a power-distribution network;
   an inverter coupled to the power interface;
   a ripple filter coupled to the inverter;
   a compensation capacitor coupled to the power interface; and
   at least one controller configured to
      determine a target output current for the power compensator to provide to the power-distribution network via the power interface,
      determine a capacitor compensation current provided by the compensation capacitor, and
      control the inverter to provide an inverter current to the power interface, the inverter current being a difference between the target output current and the capacitor compensation current.

2. The power compensator of claim 1, wherein the compensation capacitor is coupled in parallel with the inverter.

3. The power compensator of claim 1, wherein the ripple filter includes at least one filter capacitor.

4. The power compensator of claim 3, wherein a capacitance of the compensation capacitor is between 200 mF and 300 mF, and a capacitance of the at least one filter capacitor is between 20 mF and 40 mF.

5. The power compensator of claim 3, further comprising at least one bank capacitor coupled to the inverter.

6. The power compensator of claim 1, wherein the at least one controller is further configured to receive, from one or more sensors coupled to the power-distribution network, power information indicative of a reactive current on the power-distribution network.

7. The power compensator of claim 6, wherein the target output current is equal and opposite to the reactive current.

8. The power compensator of claim 6, wherein the target output current is a leading reactive current and the reactive current on the power-distribution network is a lagging reactive current.

9. The power compensator of claim 6, wherein the at least one controller is configured to determine the compensation capacitor current based on a capacitance of the compensation capacitor and based on the power information.

10. A method for controlling a power compensator including a compensation capacitor and an inverter, the method comprising:

determining a target output current for the power compensator to provide from the power compensator to a power-distribution network;

determining a capacitor compensation current provided by the compensation capacitor;

determining a difference between the target output current and the capacitor compensation current; and controlling the inverter to provide an inverter current to the power-distribution network, the inverter current being a difference between the target output current and the capacitor compensation current.

11. The method of claim 10, wherein controlling the inverter to provide the inverter current includes controlling the inverter to draw power from at least one bank capacitor.

12. The method of claim 10, further comprising receiving, from one or more sensors coupled to the power-distribution network, power information indicative of a reactive current on the power-distribution network.

13. The method of claim 12, wherein the target output current is equal and opposite to the reactive current.

14. The method of claim 12, wherein the target output current is a leading reactive current and the reactive current on the power-distribution network is a lagging reactive current.

15. The method of claim 12, wherein determining the compensation capacitor current is based on a capacitance of the compensation capacitor and based on the power information.

16. At least one non-transitory computer-readable medium storing thereon sequences of computer-executable instructions for controlling a power compensator including a compensation capacitor and an inverter, the sequences of computer-executable instructions including instructions that instruct at least one processor to:

determine a target output current for the power compensator to provide from the power compensator to a power-distribution network;

determine a capacitor compensation current provided by the compensation capacitor;

determine a difference between the target output current and the capacitor compensation current; and control the inverter to provide an inverter current to the power-distribution network, the inverter current being a difference between the target output current and the capacitor compensation current.

17. The at least one non-transitory computer-readable medium of claim 16, wherein the instructions further instruct the at least one processor to receive, from one or more sensors coupled to the power-distribution network, power information indicative of a reactive current on the power-distribution network.

18. The at least one non-transitory computer-readable medium of claim 17, wherein the target output current is equal and opposite to the reactive current.

19. The at least one non-transitory computer-readable medium of claim 17, wherein the target output current is a leading reactive current and the reactive current on the power-distribution network is a lagging reactive current.

20. A power compensator comprising:

a power interface configured to be coupled to a power-distribution network;

an inverter coupled to the power interface;

a ripple filter coupled to the inverter;

a compensation inductor coupled to the power interface; and at least one controller configured to determine a target output current for the power compensator to provide to the power-distribution network via the power interface, determine an inductor compensation current provided by the compensation inductor, and control the inverter to provide an inverter current to the power interface, the inverter current being a difference between the target output current and the inductor compensation current.

\*    \*    \*    \*    \*